A. G. M. MICHELL.
BEARING ELEMENT.
APPLICATION FILED JAN. 17, 1918.

1,315,735.

Patented Sept. 9, 1919.
3 SHEETS—SHEET 1.

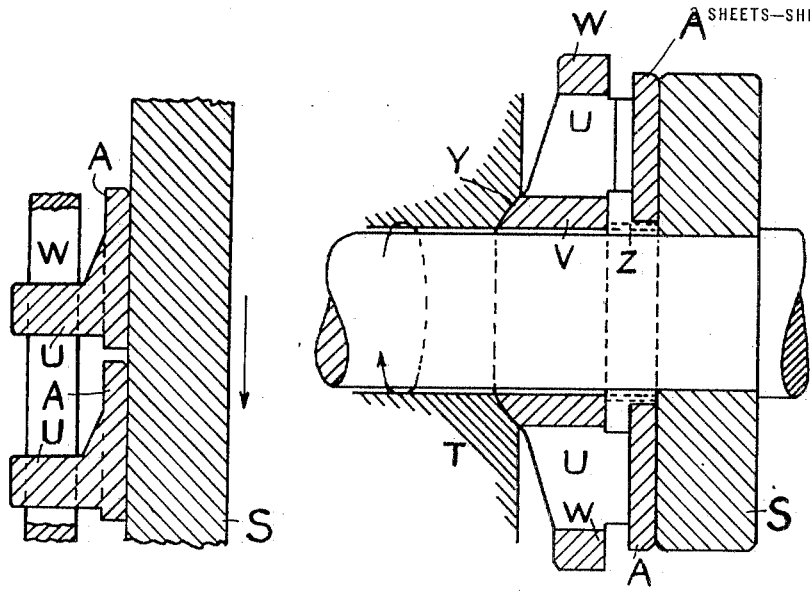
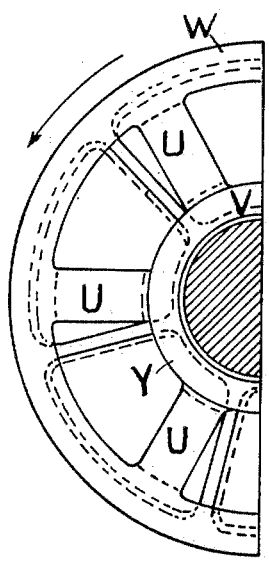
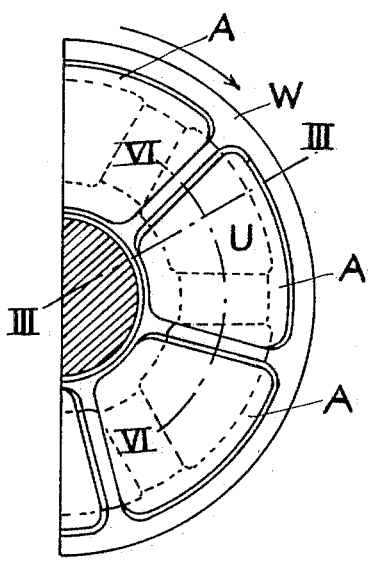

A. G. M. MICHELL.
BEARING ELEMENT.
APPLICATION FILED JAN. 17, 1918.

1,315,735.

Patented Sept. 9, 1919.
3 SHEETS—SHEET 3.

Inventor
Anthony G. M. Michell
by James L. Norris,
Attorney

UNITED STATES PATENT OFFICE.

ANTHONY GEORGE MALDON MICHELL, OF MELBOURNE, VICTORIA, AUSTRALIA.

BEARING ELEMENT.

1,315,735.  Specification of Letters Patent.  Patented Sept. 9, 1919.

Application filed January 17, 1918. Serial No. 212,242.

*To all whom it may concern:*

Be it known that I, ANTHONY GEORGE MALDON MICHELL, a subject of the King of Great Britain, and resident of Melbourne, in the State of Victoria, Commonwealth of Australia, have invented Improvements in Bearing Elements, of which the following is a specification.

This invention relates to the construction of machine parts which are in sliding or rubbing contact with other parts, for example the brasses or steps of journal bearings, the block of segmental thrust bearings, and the slippers of cross head bearings.

The object of the invention is to facilitate the formation between the relatively sliding surfaces of a film of lubricant capable of supporting the load carried by the bearing surfaces concerned.

Means for establishing this condition (viz., by pivoting the bearing element) have been described in the specifications of patents granted to the present applicant, e. g., British Patents 875/1905 and 8885/1912 relating to thrust bearings and British Patent 23496/1911 relating to journal bearings. According to the present invention the same object is attained by constructing the bearing element with a relatively weak or flexible portion on the leading side, or in the case of reversible bearings on each of the sides which alternatively acts as the leading side.

Figure 1:
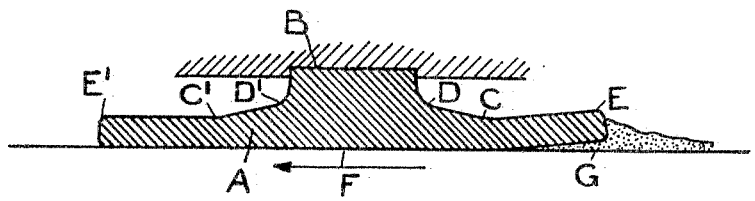
Figure 2:
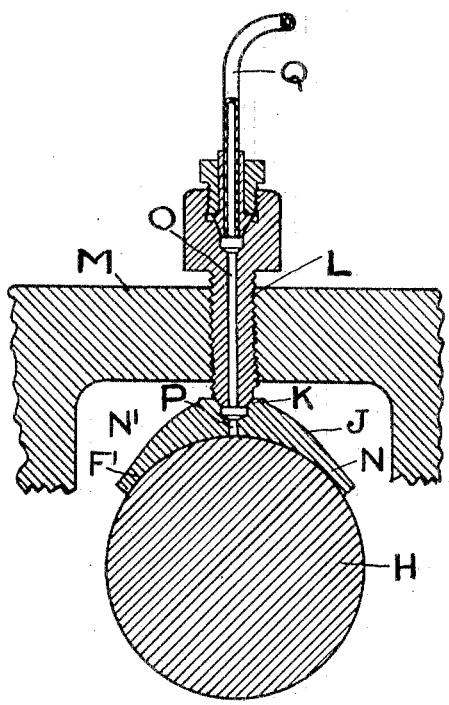

In the accompanying drawings, Figures 1 and 2 show respectively by way of example, diagrammatic sections of a bearing block for a thrust bearing and of a bearing brass for an axle of a vehicle, the sections being taken on planes parallel to the lines of relative motion.

Figs. 3, 4, 5 and 6 show the application of the invention to a complete thrust bearing, Fig. 3 being an axial section of the thrust bearing and thrust collar on the line III, III of Fig. 5, Figs. 4 and 5 partial end views, and Fig. 6 a developed partial section on the curved line VI, VI of Fig. 5.

Figures 7, 8:
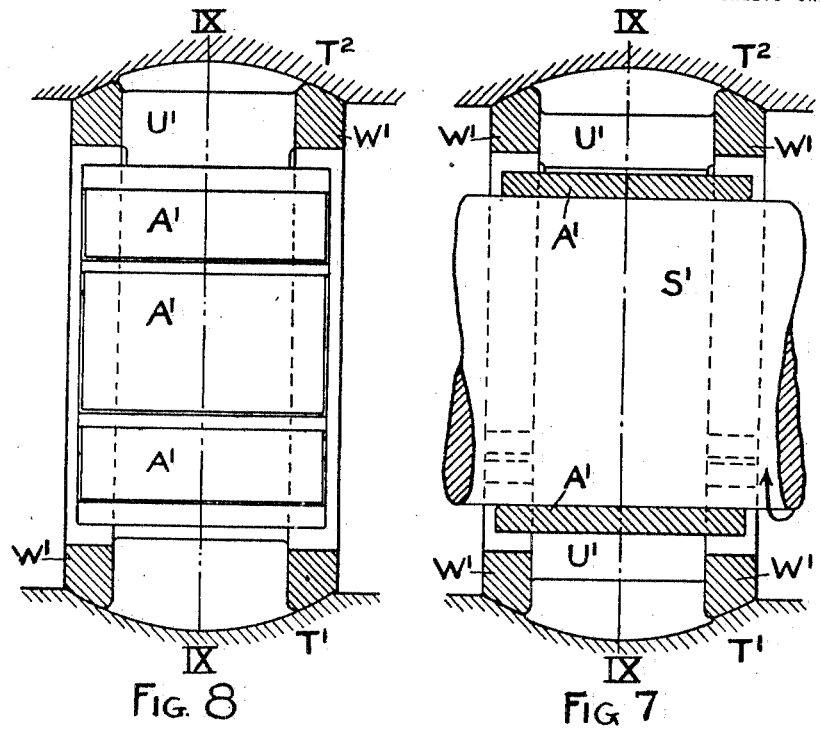
Figure 9:
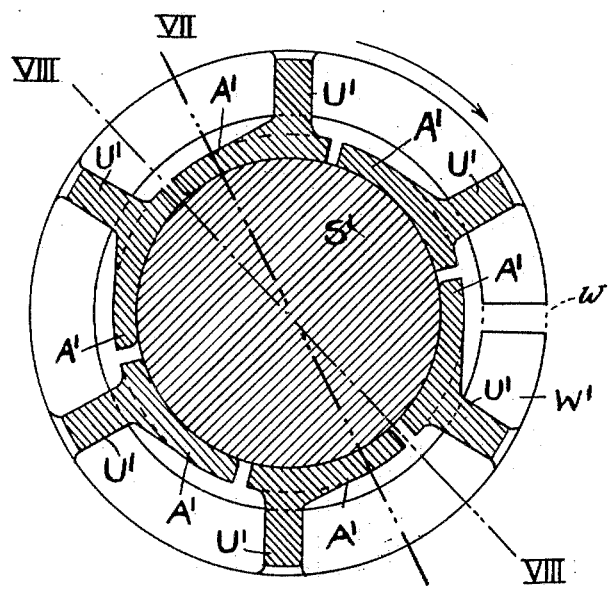

Figs. 7, 8 and 9 illustrate the application of the invention to a journal bearing, Figs. 7 and 8 being axial sections of the bearing on the lines VII, VII and VIII, VIII respectively of Fig. 9, and Fig. 9 a cross section on the line IX, IX of Figs. 7 and 8.

In Figs. 1 and 2, the bearing blocks shown are symmetrical, being designed for motion in either direction. In the remaining figures the blocks are unsymmetrical and of the type described in beforementioned Patents 875/1905 and 23496/11 respectively, being designed for motion in one direction only.

Referring to Fig. 1, the block A is supported rigidly at B, that is to say, without being pivoted, and the central portion of the block in the neighborhood of B is relatively thick and rigid. On each side as from D to E and from $D^1$ to $E^1$, the thickness of the block is reduced and the thickness of portions as C to D and $C^1$ to $D^1$ is so assigned that the material is stressed approximately to its yield point under the bending stresses due to the pressure of the film of lubricant on the working face F of the block, when such film is of the intended wedge-shaped form as hereinafter described. This pressure will vary from zero at the leading and trailing sides to a maximum at the middle of the block, the total of such pressures corresponding to the total load carried by the block. Before such wedge-shaped film is established, the total load carried by the block tends to be distributed with approximate uniformity over the working face F and the portions C to D and $C^1$ to $D^1$ will then be stressed above their elastic limits, and will yield so as to allow the desired wedge-shaped interspaces to be formed. The yielding portions C D, $C^1$ $D^1$, may occupy any extent of the length of the block necessary to secure the desired flexibility.

It will be understood that since the bending moments exerted on the block will vary at different points, the thicknesses calculated to resist those moments will also vary at different points of the yielding portions C D and $C^1$ $D^1$. If the yielding portions were extended to the edges E $E^1$ of the block, the thickness, following the same principle, would there become zero, since the bending moment at the edges is necessarily zero. For practical reasons, however, a moderate thickness is preferably adopted at the edges, and may conveniently be maintained uniform from the edges to the beginning of the yielding portions, i. e., from E to C and $E^1$ to $C^1$, as shown in the Fig. 1. These portions will consequently be relatively rigid under the forces acting on them as compared with the portions C D and $C^1$ $D^1$. In small bearings particularly, the thickness of the block may be maintained uniform from the edge to the support being calculated for the bending moment at the latter section. In this case the points C and D, and likewise the points C¹ and D¹, coincide, and the flexure is then limited to the neighborhood of the points D and D¹.

The mode of yielding of the block is shown in an exaggerated manner on the leading side in Fig. 1, the direction of motion of the surface which is in sliding contact with the block being assumed to be as shown by the arrow. The lubricant G as indicated in Fig. 1 enters the wedge-shaped interspace between the surfaces whereby fluid pressure is exerted under the central portions of the working face F capable of carrying the load of the bearing.

It will be understood that as the wedge-shaped interspace widens, a certain point is reached when the fluid pressure exerted therein is no longer sufficient to produce further yielding of the portions C D and C¹ D¹, and the block will then continue to operate in the form so assumed.

It will also be understood that if wear takes place on the central portions of the working face F, thus narrowing the wedge-shaped interspace, further yielding of the portions C D and C¹ D¹ will take place, restoring the desired working condition.

In Fig. 2 which illustrates the application of the invention to a journal bearing, the special case selected being that of an axle-bearing of a vehicle, the rotating journal H presses upwardly on the bearing brass J which is pivotally supported on a conical seat at K by the point of the stud L fixed in the top of the journal-box M. The brass J is made of reduced thickness at the sides as at N and N¹ so as to be capable of yielding under pressure at those parts as already explained in connection with Fig. 1.

For the purpose which is set out in the specification of British Patent No. 7383/1917 by the present applicant, viz., to alternately draw off oil under pressure from the bearing and again to supply oil under pressure thereto, the stud L is made hollow, a hole O drilled through it communicating at the lower end with a hole P drilled through the brass to the working face F¹, and also with a pipe Q extending out of the bearing, said pipe forming a conductor whereby the oil under pressure is withdrawn and supplied. To allow of movement of the journal-box M with respect to the frame of the vehicle, the pipe Q may be made flexible as by being coiled in a spiral.

In Figs. 3, 4, 5, and 6, a complete thrust bearing is shown arranged as described in beforementioned Patent No. 875/05 and embodying the method of construction of the bearing elements which constitutes the present invention. The bearing blocks A—six in number—form an annular series being rigidly supported by being constructed as parts of a common casting which transmits the thrust from the rotating thrust collar S to the fixed casing T of the machine. The individual thrust blocks A are reduced in thickness in their leading portions (the motion being in one direction only) as already described in connection with Fig. 1. Each block A is attached to and supported by one of the ribs or spokes U of the casting, these spokes being attached to the central boss V and connected together for the sake of additional strength and rigidity by the peripheral ring W. The rear side of the boss V may be formed with a spherical surface Y fitting a correspondingly spherical seat in the casing T and so permitting the whole casting to swivel and distribute the total pressure equally between the various blocks A. The boss V may be furnished with an extension in the form of a ring as shown by dotted lines at Z, Z, to make contact with the central portion of the collar S. Where it is desired to inclose the bearing in an oil-tight casing, this construction may be used to prevent leakage of oil along the shaft, the contact of the surfaces Y and Z obviating the necessity of using a stuffing box or the like.

In Figs. 7, 8 and 9 which illustrate the application of the invention to a journal bearing constructed according to beforementioned Patent 23496/11, the bearing elements A¹ having the form of segmental plates, each with a yielding portion as already described in connection with Fig. 2, are parts of a common casting surrounding the journal S¹. Each element A¹ is supported upon a rib U¹ of the casting, such ribs being held together by the annular portions W¹ to form the complete bearing. The annular portions W¹ are formed to a spherical surface having its center at the middle point of the bearing, and are supported by correspondingly spherical surfaces T¹ T² formed in the casing of the machine whereby the bearing is enabled to adjust itself to angular movement of the shaft S¹.

To provide means for compensating for wear of the shaft or bearing, the rings W¹ may each be divided as shown at "w", the casing being also divided into two portions T¹, T² corresponding to the plumber block and cap of ordinary journal bearings with means for drawing them together and so tightening the elements A¹ upon the shaft S¹. Where such adjustment is not required the rings W¹ will be continuous without a gap as "w" and as shown by dotted lines in Fig. 9. Alternately the rings W¹ may be divided at two points at opposite ends of a diameter thus separating the casting into two portions corresponding to the upper and lower brasses of an ordinary journal bearing.

It is to be understood that the term "concentric elements" hereinafter employed embraces both annular elements (such as illustrated in Figs. 3, 4, 5, and 6) and circumferential elements (such as illustrated in Figs. 7, 8 and 9.)

It will be understood that the principle of the invention, i. e., the construction of bearing elements with certain yielding portions or regions of weakness for the purpose of allowing the working faces to deflect for the admission of oil films, may be applied to other machine elements than those illustrated in the figures and described above. For instance, a block with a plane working face F as shown in Fig. 1 may be used as the slipper block of an engine crosshead or any similar sliding part. Likewise a construction similar to that shown in Fig. 2 may be applied to many other types of bearing, with or without means of supplying and withdrawing the oil under pressure.

What I claim is:—

1. In a bearing element, a region or regions of yielding or reduced bending strength terminating short of the leading or trailing side of said element.

2. In a bearing element, a region or regions of reduced bending strength, in combination with an adjacent relatively rigid region or regions supporting the bearing element.

3. In a bearing element, in combination, a support for the element consisting of a relatively rigid portion, and a relatively yielding portion or portions capable of flexure and disposed adjacent said support, said latter portion or portions terminating short of the leading or trailing side or sides of the bearing element.

4. In a bearing, in combination, concentrically arranged elements having a region or regions of reduced bending strength, and a relatively rigid region or regions adjacent said reduced strength region or regions.

5. In a bearing, in combination, concentrically arranged elements having a region or regions of yielding or reduced bending strength, and supporting means for bearing elements consisting of rings and ribs integral with said bearing elements.

6. In a bearing, in combination, concentrically arranged elements having a region or regions of reduced bending strength, a relatively rigid region or regions adjacent said reduced region or regions and supporting means for the bearing elements.

7. In a bearing, in combination, concentrically arranged elements having a region or regions of reduced bending strength, a relatively rigid region or regions adjacent said reduced strength region or regions, and supporting means for the bearing elements consisting of rings and ribs integral with said bearing elements.

8. In a bearing, in combination, concentrically arranged elements having a region or regions of reduced bending strength, and supporting means for the bearing elements consisting of rings and ribs integral with said bearing elements, the said rings being divided to allow of adjustment for wear.

9. In a bearing, in combination, concentrically arranged elements having a region or regions of reduced bending strength, and a relatively rigid region or regions adjacent said reduced strength region or regions and supporting means for the bearing elements consisting of rings and ribs integral with said bearing elements, the said rings being divided to allow of adjustment for wear.

ANTHONY GEORGE MALDON MICHELL.